United States Patent
Maeshima (10) Patent No.: US 10,826,090 B2
(45) Date of Patent: Nov. 3, 2020

(54) METHOD FOR CONTROLLING FUEL CELL SYSTEM AND FUEL CELL SYSTEM

(71) Applicant: NISSAN MOTOR CO., LTD., Yokohama (JP)

(72) Inventor: Susumu Maeshima, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 138 days.

(21) Appl. No.: 16/060,187

(22) PCT Filed: Oct. 20, 2016

(86) PCT No.: PCT/JP2016/081127
§ 371 (c)(1),
(2) Date: Jun. 7, 2018

(87) PCT Pub. No.: WO2017/104255
PCT Pub. Date: Jun. 22, 2017

(65) Prior Publication Data
US 2018/0366749 A1 Dec. 20, 2018

(30) Foreign Application Priority Data
Dec. 15, 2015 (JP) .................. 2015-243820

(51) Int. Cl.
*H01M 8/0438* (2016.01)
*H01M 8/12* (2016.01)
(Continued)

(52) U.S. Cl.
CPC ... *H01M 8/04432* (2013.01); *H01M 8/04014* (2013.01); *H01M 8/04104* (2013.01); *H01M 8/04228* (2016.02); *H01M 8/04302* (2016.02); *H01M 8/04303* (2016.02); *H01M 8/04365* (2013.01); *H01M 8/04388* (2013.01); *H01M 8/04701* (2013.01); *H01M 8/04753* (2013.01); *H01M 8/04761* (2013.01); *H01M 8/04955* (2013.01); *H01M 8/12* (2013.01);
(Continued)

(58) Field of Classification Search
None
See application file for complete search history.

(56) References Cited

U.S. PATENT DOCUMENTS

| 2002/0110710 A1 | 8/2002 | Keskula et al. |
| 2012/0251911 A1* | 10/2012 | Kikuchi .......... H01M 8/0494 |
| | | 429/429 |

FOREIGN PATENT DOCUMENTS

| JP | 10-40939 A | 2/1998 |
| JP | 2004-296351 A | 10/2004 |

(Continued)

*Primary Examiner* — Daniel S Gatewood
(74) *Attorney, Agent, or Firm* — Foley & Lardner LLP (57) ABSTRACT

A method for controlling a fuel cell system is a method for controlling a fuel cell system including a solid oxide fuel cell which generates a power upon receiving supplies of an anode gas and a cathode gas. The method for controlling the fuel cell system includes; as a stop control of the fuel cell, stopping a supply of the anode gas while continuing a supply of the cathode gas to the fuel cell, and shutting off a discharge side of an anode of the fuel cell; and carrying out an additional control to supply the anode gas to the fuel cell during the stop control and/or an additional control to decrease the flow rate of the cathode gas during the stop control.

15 Claims, 7 Drawing Sheets

(51) Int. Cl.
*H01M 8/04303* (2016.01)
*H01M 8/04746* (2016.01)
*H01M 8/04228* (2016.01)
*H01M 8/04014* (2016.01)
*H01M 8/04089* (2016.01)
*H01M 8/04955* (2016.01)
*H01M 8/04701* (2016.01)
*H01M 8/04302* (2016.01)
*H01M 8/0432* (2016.01)
*H01M 8/124* (2016.01)

(52) U.S. Cl.
CPC .... *H01M 8/04022* (2013.01); *H01M 8/04395* (2013.01); *H01M 2008/1293* (2013.01)

(56) References Cited

FOREIGN PATENT DOCUMENTS

| | | | |
|---|---|---|---|
| JP | 2008-198486 A | | 8/2008 |
| JP | 2010-27579 A | | 2/2010 |
| JP | 2010-067539 A | | 3/2010 |
| JP | 2010-238379 A | | 10/2010 |
| JP | 2012-252945 A | | 12/2012 |
| JP | 2013-186945 A | | 9/2013 |
| JP | 2014-146477 A | | 8/2014 |
| JP | 2014146477 A | * | 8/2014 |

* cited by examiner

METHOD FOR CONTROLLING FUEL CELL SYSTEM AND FUEL CELL SYSTEM

TECHNICAL FIELD

The present invention relates to a method for controlling a fuel cell system and a fuel cell system.

BACKGROUND ART

JP 2010-27579A discloses a discharged gas combustor in which an anode-off gas and a cathode off-gas, both gases having been used in a solid oxide fuel cell body, are mixed and burnt. With this discharged gas combustor, the gases after having been used in the fuel cell are changed to harmless gases, whereby they are discharged to outside.

On the other hand, in the fuel cell, upon stopping the system, it is necessary to cool down the fuel cell by continuing the supply of a cathode gas to be supplied to the fuel cell as a cooling gas. At this time, there is a possibility that the cooling gas which includes oxygen flows back via the discharged gas combustor to a discharged gas path through which the anode off-gas flows thereby causing to oxidize the anode. Accordingly, when the fuel cell is cooled down, this discharged gas path is shut off so as to prevent the back flow of the cooling gas.

SUMMARY OF INVENTION

However, if cooling of the fuel cell is continued in the state that the discharged gas path is shut off, pressure of the anode in the fuel cell is dropped to cause an increase in the pressure difference between the anode and the cathode in the fuel cell, and thereby there is a possibility that the fuel cell is deteriorated.

The present invention has an object to provide the method for controlling a fuel cell system, wherein a deterioration of the fuel cell can be avoided in a stop control of the fuel cell in which cooling-down thereof is carried out with avoiding oxidation of the anode.

According to an aspect of the present invention, a method for controlling a fuel cell system including a solid oxide fuel cell which generates a power upon receiving supplies of an anode gas and a cathode gas is provided. The method for controlling the fuel cell system includes; as a stop control of the fuel cell, stopping a supply of the anode gas while continuing a supply of the cathode gas to the fuel cell, and shutting off a discharge side of an anode of the fuel cell; and carrying out an additional control to supply the anode gas to the fuel cell during the stop control and/or an additional control to decrease the flow rate of the cathode gas during the stop control.

DESCRIPTION OF EMBODIMENTS

Hereunder, embodiments of the present invention will be explained with referring to the drawings.

[Composition of the Fuel Cell System]

Figure 1:
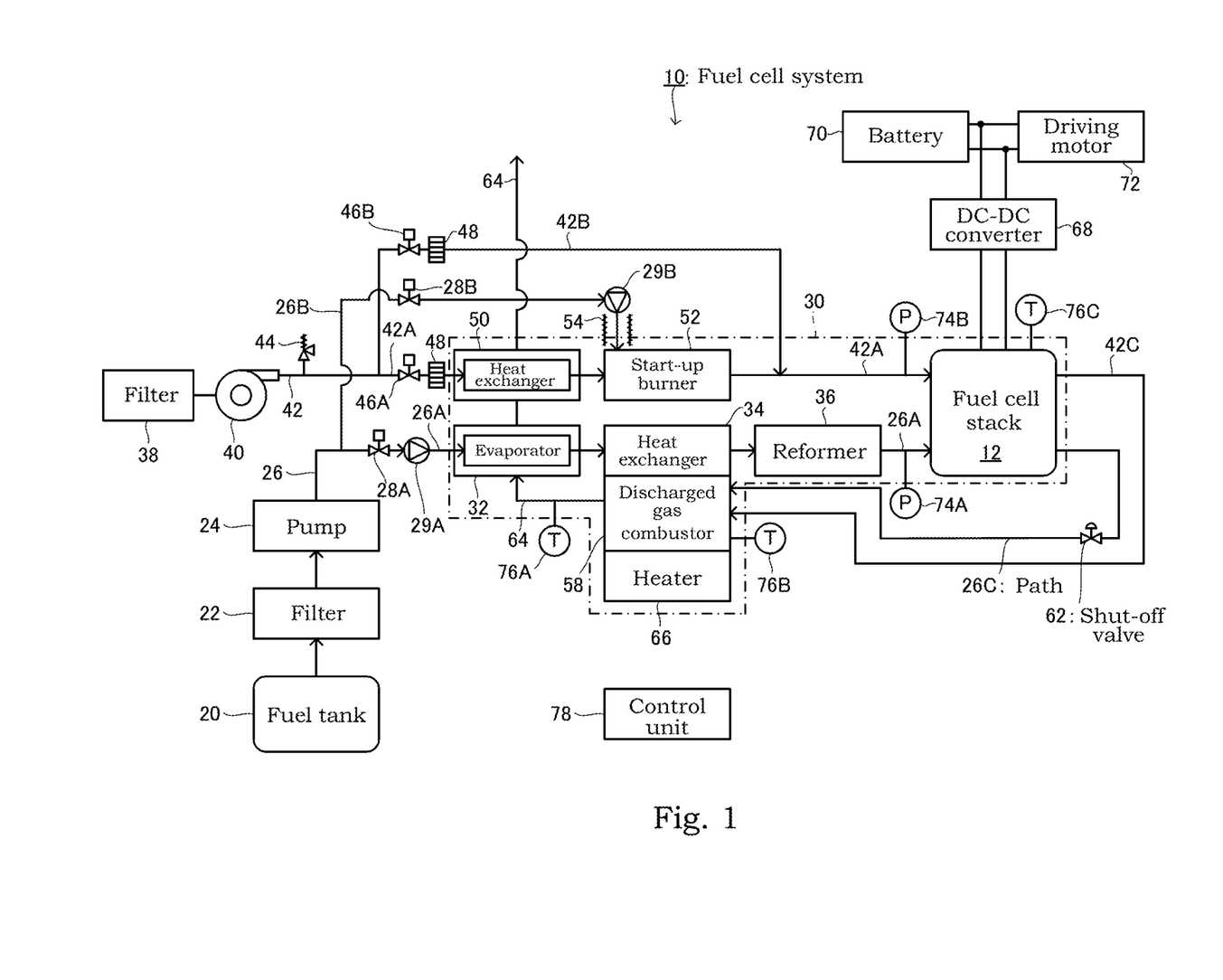
FIG. 1 is a block diagram showing main components of the fuel cell system to realize the method for controlling the fuel cell system according to the present embodiment.

FIG. 1 is a block diagram showing main components of a fuel cell system 10 to realize the method for controlling the fuel cell system according to the present embodiment. The fuel cell system 10 comprises a fuel supply system which supplies an anode gas (fuel gas) to a fuel cell stack 12, a warm-up system to warm up the fuel cell stack 12, an air supply system which supplies an air to the warm-up system and to the fuel cell stack 12, a gas discharge system which discharges an anode off-gas (anode gas) and a cathode off-gas (cathode gas) that are discharged from the fuel cell stack 12, and a driving system which obtain a motive power by taking a power out from the fuel cell stack 12.

The fuel supply system includes a fuel tank 20, a filter 22, a pump 24, an evaporator 32, a heat exchanger 34, a reformer 36, and so forth. The warm-up system includes a start-up burner 52 and so forth. The air supply system includes a filter 38, a compressor 40, a heat exchanger 50, and so forth. The gas discharge system includes a discharged gas combustor 58 and so forth. The driving system includes a DC-DC converter 68, a battery 70, a driving motor 72, and so forth. In addition, the fuel cell system 10 is provided with a control unit 78 which controls operations of the entire system.

Among the main components mentioned above, the fuel cell stack 12, the evaporator 32, the heat exchanger 34, the reformer 36, the heat exchanger 50, the start-up burner 52, the discharged gas combustor 58, and a heater 66 are stowed in a heat insulating member 30 so as to reduce discharge of a heat to outside thereby suppressing temperature drop of each equipment during a power generation control.

The fuel cell stack 12 is the solid oxide fuel cell (SOFC) which is a stack of the cells each of which is obtained by sandwiching an electrolyte layer formed of a solid oxide such as a ceramic between an anode (fuel electrode) into which an anode gas (fuel gas) that is reformed by a reformer 36 is supplied and a cathode (air electrode) into which an air including oxygen is supplied as a cathode gas (oxidizing gas). In the fuel cell stack 12, a power is generated by causing to react hydrogen included in the anode gas with oxygen included in the cathode gas, and also the anode off-gas and the cathode off-gas (this includes oxygen) formed after the reaction are discharged. To the fuel cell stack 12, a temperature sensor 76C is attached so as to measure a temperature inside the fuel cell stack 12.

To the fuel cell stack 12 (manifold) are connected a path 26A through which the anode gas is supplied to the fuel cell stack 12, a path 42A through which a heating gas (combustion gas) is supplied to the fuel cell stack 12 during warm-up and the cathode gas is supplied to the fuel cell stack 12 during a power generation control, a path 26C (discharged gas path) through which the anode off-gas (anode gas) discharged from the fuel cell stack 12 is introduced into the discharged gas combustor 58, and a path 42C through which the cathode off-gas (cathode gas) discharged from the fuel cell stack 12 is introduced into the discharged gas combustor 58. In addition, a shut-off valve 62 is attached in the discharge side of the anode off-gas (anode gas) of the fuel cell stack 12, i.e., in the path 26C. An open and close of the shut-off valve 62 is controlled by the control unit 78. The shut-off valve 62 opens the path 26C during the power generation control of the fuel cell stack 12, but shuts off the path 26C during the warm-up control and the stop control of the fuel cell system 10, which will be mentioned later.

Meanwhile, the anode means to include, not only an anode electrode which constitutes the fuel cell stack 12, but also a path inside the fuel cell stack 12 through which the anode gas is supplied to the anode electrode as well as a path inside the fuel cell stack 12 through which the anode off-gas after the reaction at the anode electrode is discharged. By the same token, the cathode means to include, not only a cathode electrode which constitutes the fuel cell stack 12, but also a path inside the fuel cell stack 12 through which the cathode gas is supplied to the cathode electrode as well as a path inside the fuel cell stack 12 through which the cathode off-gas after the reaction at the cathode electrode is discharged.

The fuel tank 20 stores a fuel to be reformed, which is a liquid such as, for example, a mixture of ethanol and water. The pump 24 sucks the fuel to be reformed so as to supply it to the fuel supply system with a certain pressure. The filter 22, which is arranged between the fuel tank 20 and the pump 24, removes contaminants in the fuel to be reformed that is sucked by the pump 24.

A path 26 through which the fuel to be reformed is supplied from the fuel tank 20 is branched out to a path 26A through which the fuel to be reformed is supplied to the evaporator 32, and to a path 26B through which a fuel for heating-up (fuel to be reformed) is supplied to the start-up burner 52. To the path 26A is attached a throttle 28A with which a flow rate of the fuel to be reformed that flows through the path 26A can be controlled by the control of the control unit 78. By the same token, a throttle 28B is attached to the path 26B.

The throttle 28B opens the path 26B with a certain opening degree during the warm-up control of the fuel cell system 10 so as to flow the fuel for heating-up to an injector 29B, and shuts off the path 26B when the warm-up control is terminated. The throttle 28A shuts off the path 26A during the warm-up control, but opens the path 26A with a certain opening degree at the termination of the warm-up control so as to flow the fuel to be reformed to an injector 29A. Further, the throttle 28A opens with a certain opening degree during the stop control so as to flow the fuel to be reformed to the injector 29A.

The evaporator 32 gasifies the fuel to be reformed that is supplied from the injector 29A by utilizing the heat of an exhaust gas that is discharged from the discharged gas combustor 58. The heat exchanger 34 further heats up the fuel to be reformed that was gasified by the heat supplied from the discharged gas combustor 58 so as to reform it in the reformer 36.

The reformer 36 reforms the fuel to be reformed by a catalytic reaction to the anode gas containing hydrogen so as to be supplied to the fuel cell stack 12 (anode).

The compressor 40 takes in the outside air through the filter 38 so as to supply the air to the fuel cell stack 12 and so forth. A path 42 through which the air discharged from the compressor 40 is supplied is provided with a relief valve 44, which opens the path 42 when a pressure inside the path 42 rises up beyond a certain value so as to avoid the compressor 40 from receiving a load beyond a certain value. The path 42 is branched out to the path 42A through which the air is supplied to the heat exchanger 50 and to a path 42B which bypasses the heat exchanger 50 and the start-up burner 52 and then converges with the path 42A.

The path 42A is provided with a throttle 46A, and the path 42B is provided with a throttle 46B, in order to control a flow rate of the air in each of the paths by the control unit 78. In the downstream positions of respective throttles in the respective paths, anti-backfire equipment 48 to hold back a flame is arranged. Meanwhile, the throttle 46B supplies the air to the path 42A during the warm-up control of the fuel cell stack 12, but shuts off the path 42B after termination of the warm-up control.

The heat exchanger 50 heats up the air for the heating gas or the air for the cathode gas, by utilizing the heat of the exhaust gas from the discharged gas combustor 58.

During the warm-up control of the fuel cell system 10, the start-up burner 52 mixes the air that was heated up by the heat exchanger 50 and supplied therefrom with the fuel for heating-up that was supplied from the injector 29B and heated up by an electric heater 54. Then, the mixture of the air with the fuel for heating-up is ignited by an ignition device attached to the start-up burner 52 to generate a high temperature combustion gas. Not only this combustion gas scarcely contains oxygen thereby being mainly composed of an inert gas, but also the temperature thereof becomes so high that it can damage the fuel cell stack 12. However, the combustion gas is cooled down by mixing with the air from the path 42B so that not only it is cooled down to a suitable temperature to warm up the fuel cell stack 12 but also it becomes a heating gas that includes oxygen. Meanwhile, after termination of the warm-up control, generation of the combustion gas and the heating gas are terminated, whereby the control is moved to the power generation control in which supply of the air passing through the heat exchanger 50 and the start-up burner 52 to the fuel cell stack 12 is continued so as to be used as the cathode gas.

During the power generation control, the discharged gas combustor 58 mixes the anode off-gas (anode gas) supplied from the path 26C with the cathode off-gas (cathode gas) supplied from the path 42C, and catalytically burns the resulting mixed gas to generate an exhaust gas mainly composed of carbon dioxide and water, and at the same time, the heat generated by the catalytic combustion is transmitted to the heat exchanger 34 and so forth. Also, during the warm-up control, the discharged gas combustor 58 burns the heating gas (including oxygen) supplied from the path 42C to generate the exhaust gas similar to that mentioned before. The discharged gas combustor 58 is connected to a path 64 through which the exhaust gas after being burnt is discharged, and further, the path 64 is connected to a muffler (not shown in the figure) after passing through the evaporator 32 and the heat exchanger 50. Therefore, the evaporator 32 and the heat exchanger 50 are heated up by the exhaust gas. During the stop control, too, the discharged gas combustor 58 mixes the anode gas discharged from the path 26C with the cooling gas (cathode gas) discharged from the path 42C, and burns the resulting mixed gas to generate the exhaust gas.

The heater 66 heats up the discharged gas combustor 58, in which various heating methods including a resistance heating method and an induction heating method may be used. During the warm-up control, by the control unit 78, the heater 66 is driven so as to heat up the discharged gas combustor 58 until the temperature thereof reaches a combustion capable temperature (second prescribed temperature) which is a lower limit temperature at which the catalytic combustion can take place. During the stop control, the heater 66 is driven even when the temperature of the discharged gas combustor 58 becomes equal to or lower than the combustion capable temperature.

A pressure sensor 74A measures the pressure inside the path 26A, namely, it measures the pressure of the anode of the fuel cell stack 12. A pressure sensor 74B measures the pressure inside the path 42A, namely, it measures the pressure of the cathode of the fuel cell stack 12. Information of the pressures measured with the pressure sensors 74A and 74B is put into the control unit 78.

A temperature sensor 76A measures the temperature of the exhaust gas flowing thorough the path 64. By measuring the temperature of this gas, the temperature of the catalyst portion of the discharged gas combustor 58 can be calculated. A temperature sensor 76B measures the temperature of the discharged gas combustor 58, especially the temperature of the opening portion to introduce the anode off-gas or the cathode off-gas. With this, the temperature of the catalyst portion of the discharged gas combustor 58 can be calculated during the warm-up control and the stop control. Information of the temperatures measured with the temperature sensors 76A and 76B is put into the control unit 78.

The DC-DC converter 68, which is connected to the fuel cell stack 12, raises the output voltage of the fuel cell stack 12 so as to send this power to the battery 70 or to the driving motor 72. The battery 70 charges the power supplied from the DC-DC converter 68, and also supplies the power to the driving motor 72. The driving motor 72 is connected to the battery 70 and to the DC-DC converter 68 via an inverter (not shown in the figure) so as to be a power source of the vehicle. The driving motor 72 generates a regenerative power upon applying a brake to a vehicle, thereby this power can be charged in the battery 70.

The control unit 78 includes a widely used electronic circuit, including a microcomputer, a microprocessor, and a CPU, as well as peripheral equipment, wherein by executing specific programs, processes to control the fuel cell system 10 are carried out. In addition, the control unit 78 can carry out the drive and stop control (ON/OFF control) of the composition elements which constitute the fuel cell system 10. To the throttles 28A and 28B, the control to adjust the flow rate of the fuel to be reformed can be carried out; on the other hand, to the throttles 46A and 46B, the control to adjust the flow rate of the air (cathode gas, etc.) can be carried out. With regard to the control of the fuel cell system 10 that is carried out by the control unit 78, as will be mentioned later, there are the warm-up control to warm up the fuel cell stack 12, the power generation control to carry out the normal power generation, and the stop control to stop the system. Meanwhile, though omitted in the figure, it may be configured such that a circuit by which an electromotive force whose polarity is opposite to the fuel cell stack 12 is applied to the fuel cell stack 12 from outside is connected thereto so that the control unit 78 can carry out a switch control to this circuit during the stop control so as to suppress deterioration (oxidation) of the anode (anode electrode).

[Procedure of the Warm-up Control of the Fuel Cell System]

Figure 2:
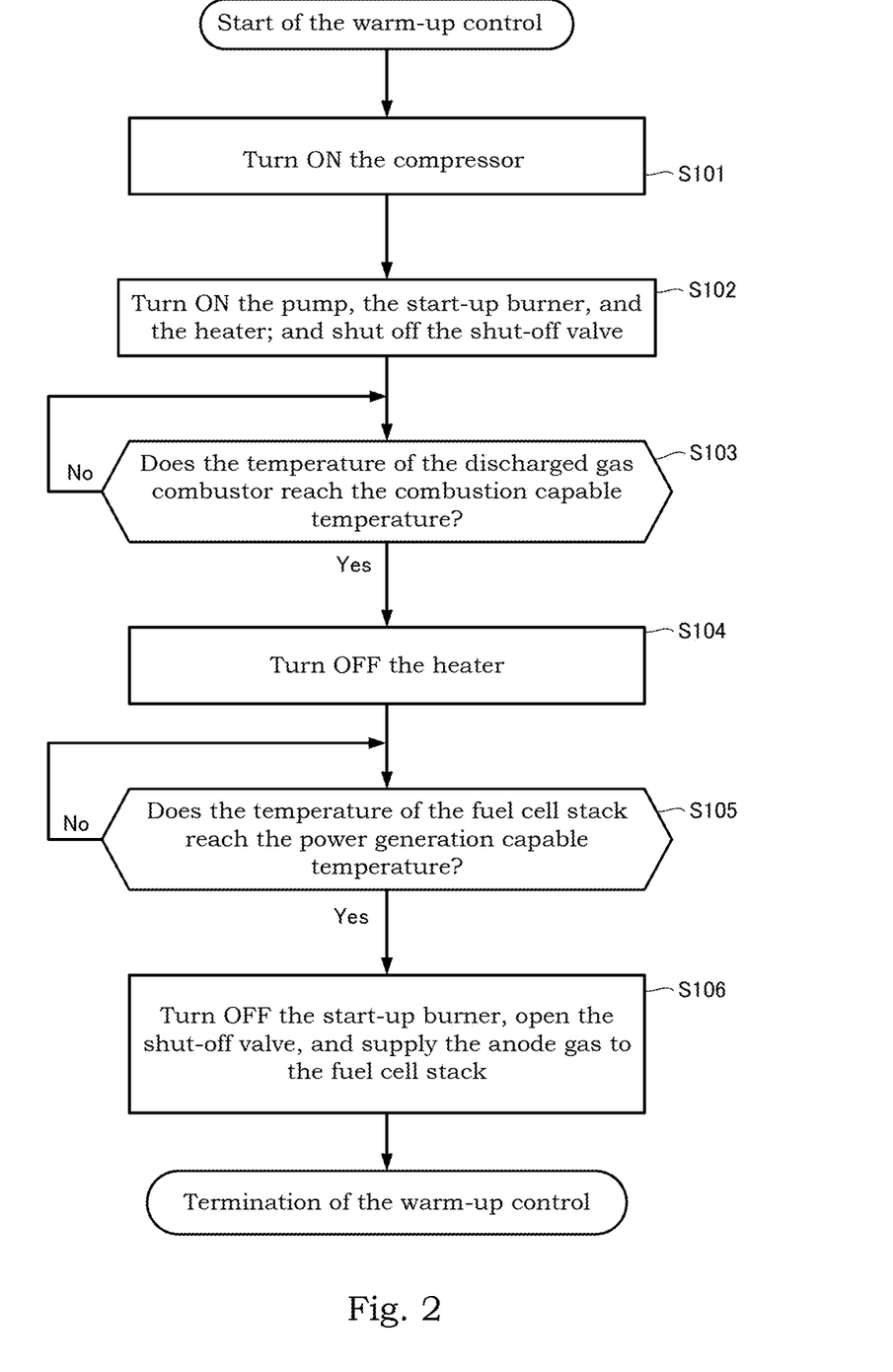
FIG. 2 is a flow chart showing procedure of the warm-up control of the fuel cell system.

The flow chart that shows the procedure of the warm-up control of the fuel cell system 10 will be explained with referring to FIG. 2.

Start of the warm-up control of the fuel cell system 10 is triggered with the driver's ON operation of ignition (operation to turn ON the vehicle's key). As illustrated in FIG. 2, first, when the system starts the warm-up control, in Step S101, the control unit 78 turns ON the compressor 40 as well as the throttles 46A and 46B. With this, the air flows through the paths 42A and 42B with a certain flow rate.

In Step S102, the control unit 78 carries out the control to turn ON the pump 24, the throttle 28B, the start-up burner 52, and the heater 66, as well as to shut off the shut-off valve 62. With this, the fuel for heating-up is supplied to the start-up burner 52 at a certain flow rate, and the discharged gas combustor 58 is heated up with the heater 66. And, the fuel for heating-up is mixed with the air in the start-up burner 52; and by ignition of the start-up burner 52, a high temperature combustion gas is generated. This combustion gas is mixed with the air which joins from the path 42B thereby forming a heating gas, which is supplied to the fuel cell stack 12 (cathode), whereby the fuel cell stack 12 is warmed up (heated up). Also, by the heat conductance from the combustion gas and the heating gas, composition elements including the heat exchanger 34, the reformer 36, etc., that are stowed in the heat insulating member 30 are heated up. Further, the heating gas having passed through the fuel cell stack 12 passes through the discharged gas combustor 58 as the exhaust gas, as well as through the evaporator 32 and the heat exchanger 50, with heating these devices. Therefore, the discharged gas combustor 58 is heated up by the heater 66 and the discharged gas.

In Step S103, on the basis of the temperature measured with the temperature sensor 76A or the temperature sensor 76B, the control unit 78 judges whether or not the temperature of the discharged gas combustor 58 reaches the second prescribed temperature (combustion capable temperature). In Step S103 if the control unit 78 judges YES, in Step S104 the control unit 78 turns OFF the heater 66. With this, heating-up of the discharged gas combustor 58 is continued by the discharged gas.

In Step S105, on the basis of the temperature detected by the temperature sensor 76C, the control unit 78 judges whether or not the temperature of the fuel cell stack 12 reaches a power generation capable temperature which is a lower limit temperature at which the fuel cell stack 12 can generate the power.

Meanwhile, also with regard to the evaporator 32, the heat exchanger 34, and the reformer 36, judgements whether or not the temperatures of them reached suitable respective temperatures so as to satisfactorily reform the fuel to be reformed are necessary in principle; however, if the times to reach the suitable respective temperatures of them are sooner than the time when the temperature of the fuel cell stack 12 reaches the power generation capable temperature, the judgements thereof are not necessary.

In Step S105 if the control unit 78 judges YES, in Step S106 the control unit 78 turns OFF the start-up burner 52 thereby stopping generation of the combustion gas and the heating gas, and also turns OFF the throttle 28B and the throttle 46B thereby shutting-off the path 26 B and the path 42B. In Step S106 the control unit 78 opens the shut-off valve 62 so as to open the path 26C and also turns ON the throttle 28A so as to open the path 26A.

With this, the fuel to be reformed flows from the fuel tank 20 through the injector 29A, the evaporator 32, and the heat exchanger 34 at a certain flow rate in accordance with the opening degree of the throttle 28A; and then, via the reformer 36, it becomes the anode gas (fuel gas), and this anode gas is supplied to the fuel cell stack 12 (anode). On the other hand, the air is continued to be supplied from the path 42A, heated up in the heat exchanger 50, and then supplied to the fuel cell stack 12 as the cathode gas (oxidizing gas). And then, when the electrochemical reaction by the anode gas and the cathode gas is started in the fuel cell stack 12, the warm-up control is terminated, so that the control is moved to the power generation control. Meanwhile, because the shut-off valve 62 is open, the anode off-gas having passed the fuel cell stack 12 can be introduced into the discharged gas combustor 58 through the path 26C.

Regardless of driving of the heater 66, in Step 105 if the temperature of the discharged gas combustor 58 reaches the combustion capable temperature by heating-up with the heating gas, in Step 102 it is not necessary to turn ON the heater 66, so that Step S103 and Step S104 can be omitted. Also, if a deterioration reaction temperature (prescribed temperature), which is a lower limit temperature at which deterioration such as oxidation of the anode (anode electrode) takes place, is higher than the power generation capable temperature of the fuel cell stack 12, it is not necessary to shut off the shut-off valve 62 in Step S102, so that in Step S106 the control to open the shut-off valve 62 can be omitted.

[Operation during the Power Generation Control of the Fuel Cell System]

Next, the operation during the power generation control of the fuel cell system 10 will be explained. During the power generation control of the system, first, the fuel to be reformed that is supplied from the fuel tank 20 is gasified by the evaporator 32; the gasified fuel to be reformed is heated up by the heat exchanger 34; the heated-up fuel to be reformed is reformed to the anode gas in the reformer 36; and this anode gas is supplied to the fuel cell stack 12 (anode). On the other hand, the temperature of the air as the cathode gas is raised by the heat exchanger 50, and then, it passes through the start-up burner 52 so as to be supplied to the fuel cell stack 12 (cathode). In the fuel cell stack 12 which is supplied with the anode gas and the cathode gas, the power is generated by the electrochemical reaction, thereby supplying the generated power to the DC-DC converter 68, while the anode off-gas and the cathode off-gas that have been used in the electrochemical reaction are introduced into the discharged gas combustor 58. Then, the discharged gas combustor 58 burns the anode off-gas and the cathode off-gas in the mixed state thereof, thereby generating the exhaust gas; and this gas heats up the evaporator 32 and the heat exchanger 50 while passing through these devices.

During the vehicle is driven, the supply amount of the anode gas (opening degree of the throttle 28A) as well as the supply amount of the cathode gas (opening degree of the throttle 46A) changes almost linearly in proportion to the power that is requested by the system (the battery 70 and the driving motor 72). However, in the fuel cell stack 12, the power to keep the state that the fuel cell stack 12 can generate the power, namely, the power to drive the auxiliary equipment including the pump 24, the compressor 40, and so forth, is necessary. Accordingly, even if the request power to the fuel cell stack 12 is zero, the fuel cell stack 12 generates at least the power to operate the auxiliary equipment mentioned above.

[Stop Control of the Fuel Cell System]

The stop control of the fuel cell system 10 is carried out by the control unit 78 (the stop control unit), wherein the start of this control is triggered with the driver's OFF operation of ignition (operation to turn OFF the vehicle's key) after a vehicle is stopped, or when the buttery 70 is fully charged so that the power generation request to the fuel cell stack 12 is stopped. The stop control of the fuel cell system 10 is terminated in the way described as follows. Namely, even after the power generation by the fuel cell stack 12 is stopped, supply of the cathode gas as the cooling gas is continued so as to cool down the fuel cell stack 12; and then, after the temperature of the fuel cell stack 12 is dropped to below the deterioration reaction temperature, the supply of the cooling gas is stopped. At this time, in order to avoid deterioration of the anode (anode electrode) due to back flow of the cooling gas in the path 26C through the discharged gas combustor 58 to cause the flow of oxygen into the anode, the shut-off valve 62 is shut off. In order to realize the stop control like this, the power to operate the auxiliary equipment of the fuel cell stack 12 can be covered by the battery 70 and so forth.

In the stop control of the fuel cell stack 12, not only the cathode but also the anode is cooled down. At this time, the pressure of the cathode of the fuel cell stack 12 is kept at a prescribed value, which is dependent on the pressure of the cooling gas. On the other hand, the anode is shut off by the shut-off valve 62 so that the gas remaining in the anode shrinks by cooling, resulting in decrease of the pressure of the anode. Accordingly, when the cooling down of the fuel cell stack 12 is started, a pressure difference between the anode and the cathode emerges. And when the pressure difference increases thereby becoming higher than a prescribed pressure (break down pressure), there is a possibility that the cell which constitutes the fuel cell stack 12 breaks down (deteriorates) due to this pressure difference.

Therefore, in the present embodiment, in order not to cause the breakage (deterioration) of the fuel cell stack 12 by the pressure difference, the control unit 78 (the additional control unit) carries out an additional control during the stop control. As the additional control, at least one of the following additional controls is carried out, namely, an additional control in which the flow rate of the cooling gas is decreased when the pressure difference increases so as to become more than the prescribed pressure (break down pressure), and an additional control in which the anode gas is supplied.

As to the additional control in which the anode gas is supplied to the fuel cell stack 12, there are the control (A1) in which the opening degree of the throttle 28A is made maximum and the pump 24 is driven for a certain period of time so that a prescribed amount of the fuel to be reformed is supplied all at once for a short period of time, the control (A2) in which while the pump 24 is driven, the opening degree of the throttle 28A is squeezed to a certain opening degree so as to supply the anode gas continuously, and the control (A3) in which while the pump 24 is driven, the state in which the opening degree of the throttle 28A is squeezed to a certain opening degree and the state in which the throttle 28A is shut off are alternately repeated so as to supply the anode gas intermittently.

As to the additional control in which the flow rate of the cooling gas is decreased, there are the control (B1) in which the opening degree of the throttle 46A is squeezed by a certain degree so as to decrease the flow rate of the cooling gas by a certain amount, the control (B2) in which the opening degree is continuously decreased with taking time so as to decrease the flow rate of the cooling gas continuously, and the control (B3) in which the opening degree is intermittently decreased with taking time so as to decrease the flow rate of the cooling gas intermittently.

In the stop control, the state that the shut-off valve 62 is shut off is kept until the temperature of the fuel cell stack 12 becomes lower than the deterioration reaction temperature; and thus, when the shut-off valve 62 is opened later, there is a chance that the anode gas remained in the anode, or the anode gas additionally added during the stop control diffuses thereby entering into the discharged gas combustor 58.

Therefore, in the stop control, the control to surely burn out the anode gas is also carried out in the discharged gas combustor 58.

[Procedure of the Stop Control of the Fuel Cell System]

Figure 3:
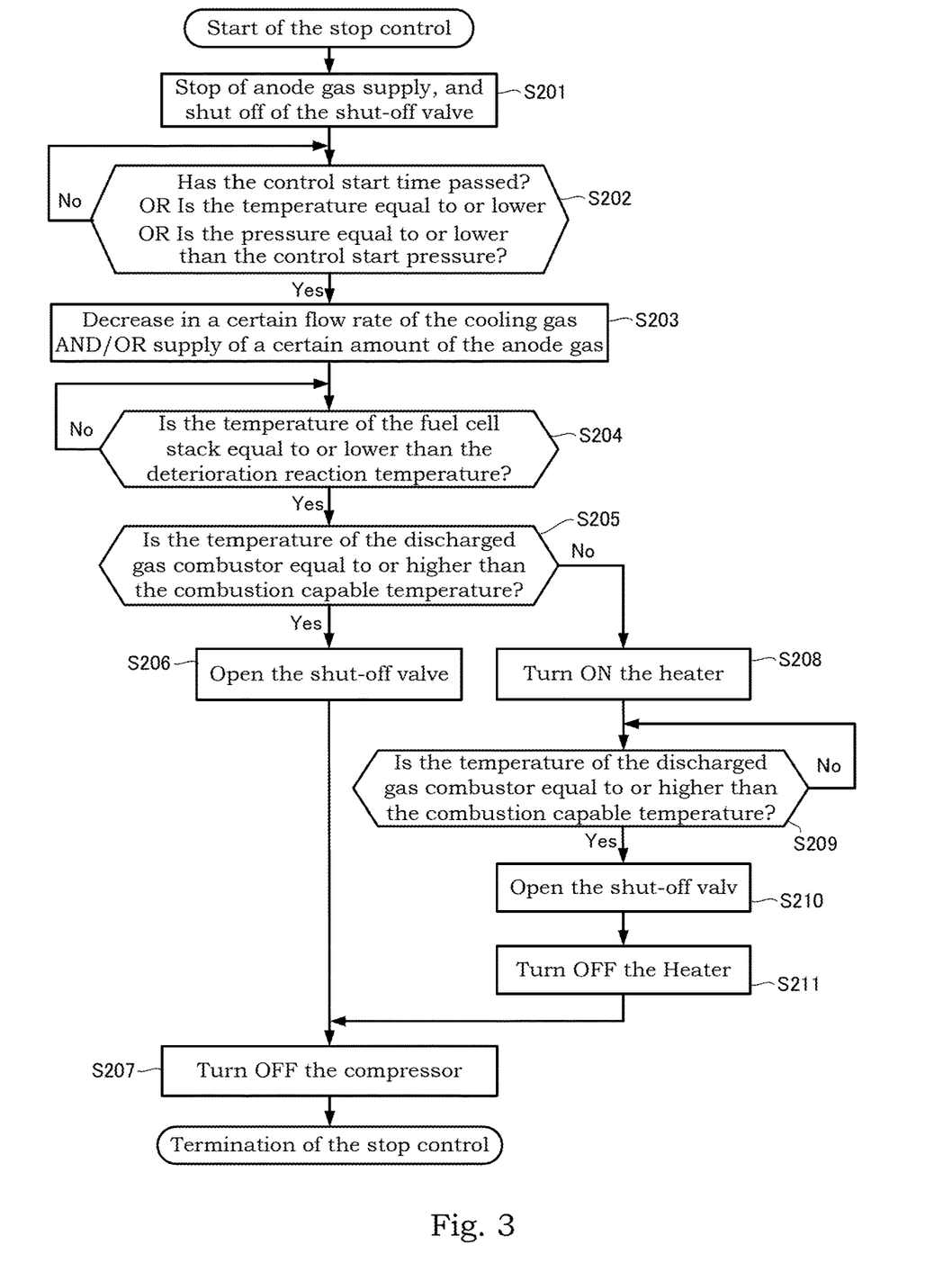
FIG. 3 is a flow chart showing procedure of the stop control of the fuel cell system.

Next, the procedure of the stop control of the fuel cell system 10 will be explained along the flow chart of FIG. 3. Here, the additional control, (A1) and/or (B1), is carried out. As shown in. FIG. 3, when the system starts the stop control, in Step S201 the control unit 78 (the stop control unit) turns OFF the pump 24 and the throttle 28A. Further, the control unit 78 (the stop control unit) shuts off the shut-off valve 62 so as to shut off the path 26C. With this, supply of the anode gas is stopped; and thus, the fuel cell stack 12 stops the power generation. At this time, supply of the cathode gas as the cooling gas is continued, so that cooling of the fuel cell stack 12 is started. Then, as mentioned before, the pressure difference between the pressure of the anode and the pressure of the cathode in the fuel cell stack 12 emerges.

Here, in order to avoid the thermal strain (stress strain) to the fuel cell stack 12 due to the rapid temperature drop, the control is suitably carried out such that, in the initial stage of the cooling, the flow rate of the cooling gas is made smaller than during the power generation control, namely, the opening degree of the throttle 46A is made smaller than during the power generation control; and with passage of time (temperature drop), the opening degree of the throttle 46A is made larger, so that the flow rate of the cooling gas is made equal to or more than the flow rate thereof during the power generation control.

In Step S202 the control unit 78 (the stop control unit) judges any one of whether or not the control start time has passed, whether or not the temperature becomes equal to or lower than the control start temperature, and whether or not the pressure becomes equal to or lower than the control start pressure. Here, the control start time means the time until the pressure difference between the anode and the cathode in the fuel cell stack 12 reaches the prescribed pressure (break down pressure) which is an upper limit pressure at which the cell of the fuel cell stack 12 can escape from the breakage as cooling of the fuel cell stack 12 progresses. The control start temperature means the temperature at which the before-mentioned pressure difference reaches the prescribed pressure (break down pressure), wherein the said temperature is the temperature of the fuel cell stack 12 which is measured with the temperature sensor 76C. The control start pressure means the pressure of the anode at which the before-mentioned pressure difference reaches the prescribed pressure (break down pressure), wherein the said pressure is the pressure measured with the pressure sensor 74A. The control start time, the control start temperature, and the control start pressure each are dependent on the size and material of the fuel cell stack 12, the residual amount of the anode gas in the fuel cell stack 12, the flow rate of the cathode gas, etc.

If the control unit 78 judges YES in Step S202, in Step S203 the control unit 78 (the additional control unit) carries out the additional control of (A1) and/or (B1). Here, the decrease in the flow rate (prescribed amount) of the cooling gas and the supply amount (prescribed amount) of the anode gas (fuel to be reformed) are set roughly in a level such that repetition of the additional control of Step S203 is not necessary even if the temperature of the fuel cell stack 12 is dropped to the deterioration reaction temperature. At this time, if the temperature of reformer 36 is equal to or lower than the temperature at which the fuel to be reformed can be reformed, the gasified fuel to be reformed is supplied to the fuel cell stack 12. By the control of Step S203, because the pressure difference between the anode and the cathode is relaxed, the state that the pressure difference is less than the prescribed pressure (break down pressure) can be kept even if the temperature of the fuel cell stack 12 drops to the deterioration reaction temperature.

In Step S204 the control unit 78 (the stop control unit) judges whether or not the temperature of the fuel cell stack 12 becomes equal to or lower than the prescribed temperature (deterioration reaction temperature). In Step S204 if the control unit 78 (stop control unit) judges YES, in Step S205 the control unit 78 (the stop control unit) judges, on the basis of the temperature measured with the temperature sensor 76A or the temperature sensor 76B, whether or not the temperature of the discharged gas combustor 58 is still equal to or higher than the second prescribed temperature (combustion capable temperature). In Step S205 if the control unit 78 (the stop control unit) judges YES, in Step S206 the control unit 78 (the stop control unit) opens the shut-off valve 62 so as to open the path 26C. With this, the anode and the cathode of the fuel cell stack 12 are communicated via the discharged gas combustor 58, so that the pressure difference between them becomes zero.

By the control of Step S206, there is a case that the anode gas (or the fuel to be reformed) that is remained in the anode enters into the discharged gas combustor 58; but even so, the discharged gas combustor 58 can burn the mixed gas of this anode gas and the cooling gas (cathode gas) thereby converting them to an exhaust gas. After passage of a prescribed time, in Step S207 the control unit 78 turns OFF the compressor 40. With this, the stop control of the fuel cell system 10 is terminated.

On the other hand, in Step S205 if the control unit 78 (the stop control unit) judges NO, in Step S208 the control unit 78 (the stop control unit) turns ON the heater 66 so as to heat up the discharged gas combustor 58. In Step S209 the control unit 78 (the stop control unit) judges whether or not the temperature of the discharged gas combustor 58 becomes equal to or higher than the second prescribed temperature (combustion capable temperature). In Step S209 if the control unit 78 (the stop control unit) judges YES, in Step S210 the control unit 78 (the stop control unit) opens the shut-off valve 62 so as to open the path 26C, in a similar manner to Step S206. Then, in Step S211 the control unit 78 (the stop control unit) turns OFF the heater 66, and then, the control is moved to Step S207 mentioned before.

Figure 4:
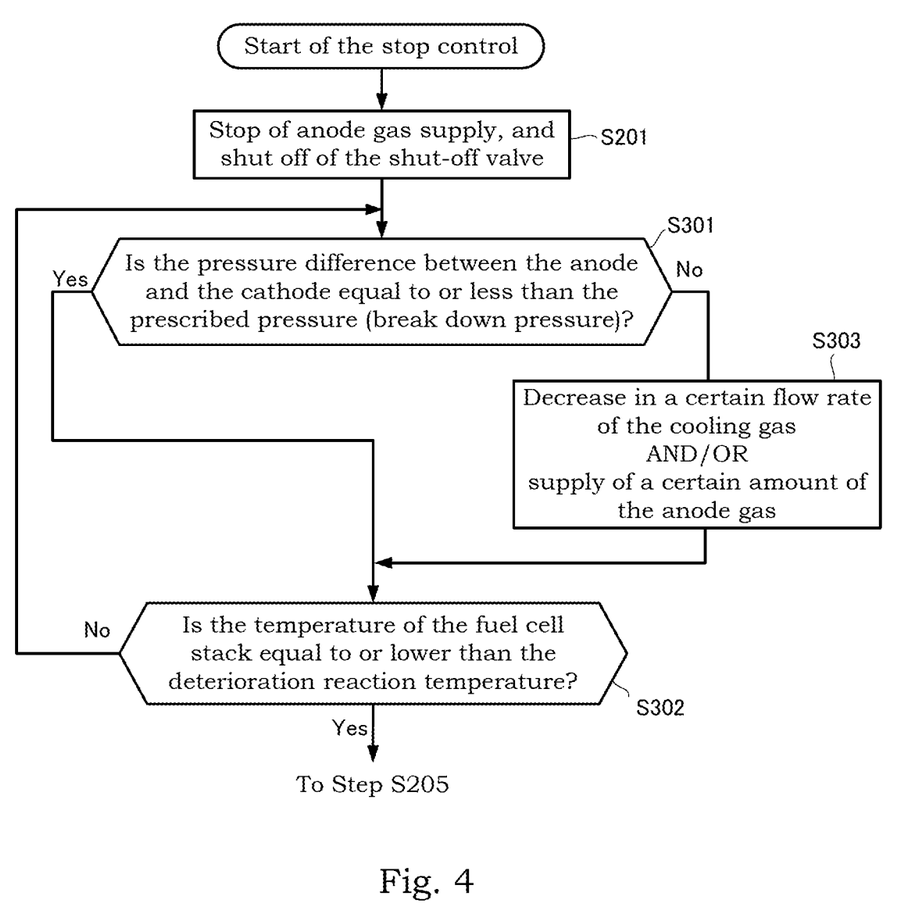
FIG. 4 is the first modified example of the flow chart shown in FIG. 3.

In FIG. 4, a first modified example of the stop control of the fuel cell system 10 is shown. In the first modified example, similarly to the before-mentioned, at least any one of the additional control (A1) and the additional control (B1) is carried out, wherein the pressure difference between the anode and the cathode is measured with the pressure sensors 74A and 74B.

After Step S201 mentioned before, in Step 301 the control unit 78 calculates the pressure difference between the pressure measured with pressure sensor 74A and the pressure measured with the pressure sensor 74B, and judges whether or not this pressure difference is equal to or less than the prescribed pressure (break down pressure). In Step S301 if the judgement of YES is made, the control moves to Step S302. In Step S302 the control unit 78 carries out the same judgment as Step S204, and if the judgement of YES is made, the control moves to Step S205 mentioned before. On the other hand, if the judgement of NO is made, the control returns to Step S301 mentioned before.

On the other hand, in Step S301 if the control unit 78 judges NO, namely, if it is judged that the pressure difference is more than the prescribed pressure, in Step S303 the same additional control as Step S203 is carried out. At this time, the decrease in the flow rate (prescribed amount) of the cooling gas and the supply amount (prescribed amount) of the anode gas (fuel to be reformed) may be made as same as those of Step S203, or may be made smaller than those of Step S203. After Step S303, the control moves to Step S302 mentioned before.

In the procedure shown in FIG. 3, the additional control of Step S203 was carried out always once. On the other hand, in the procedure of the first modified example shown in FIG. 4, there are cases that the additional control of Step S303 is carried out plural times, or is not carried even once. The case that the additional control is not carried even once is the case that the pressure difference mentioned before is not so large, because, for example, the remained amount of the anode gas is large at the time when the shut-off valve 62 is shut off, or the flow rate of the cooling gas is originally set too low, or the temperature difference between the deterioration reaction temperature and the temperature of the fuel cell stack 12 at the start of the stop control is small. On the other hand, the case that the additional control is carried out plural times is the case that the decrease in the flow rate (prescribed amount) of the cooling gas and the supply amount (prescribed amount) of the anode gas (fuel to be reformed) are smaller than those of Step S203.

Figure 5:
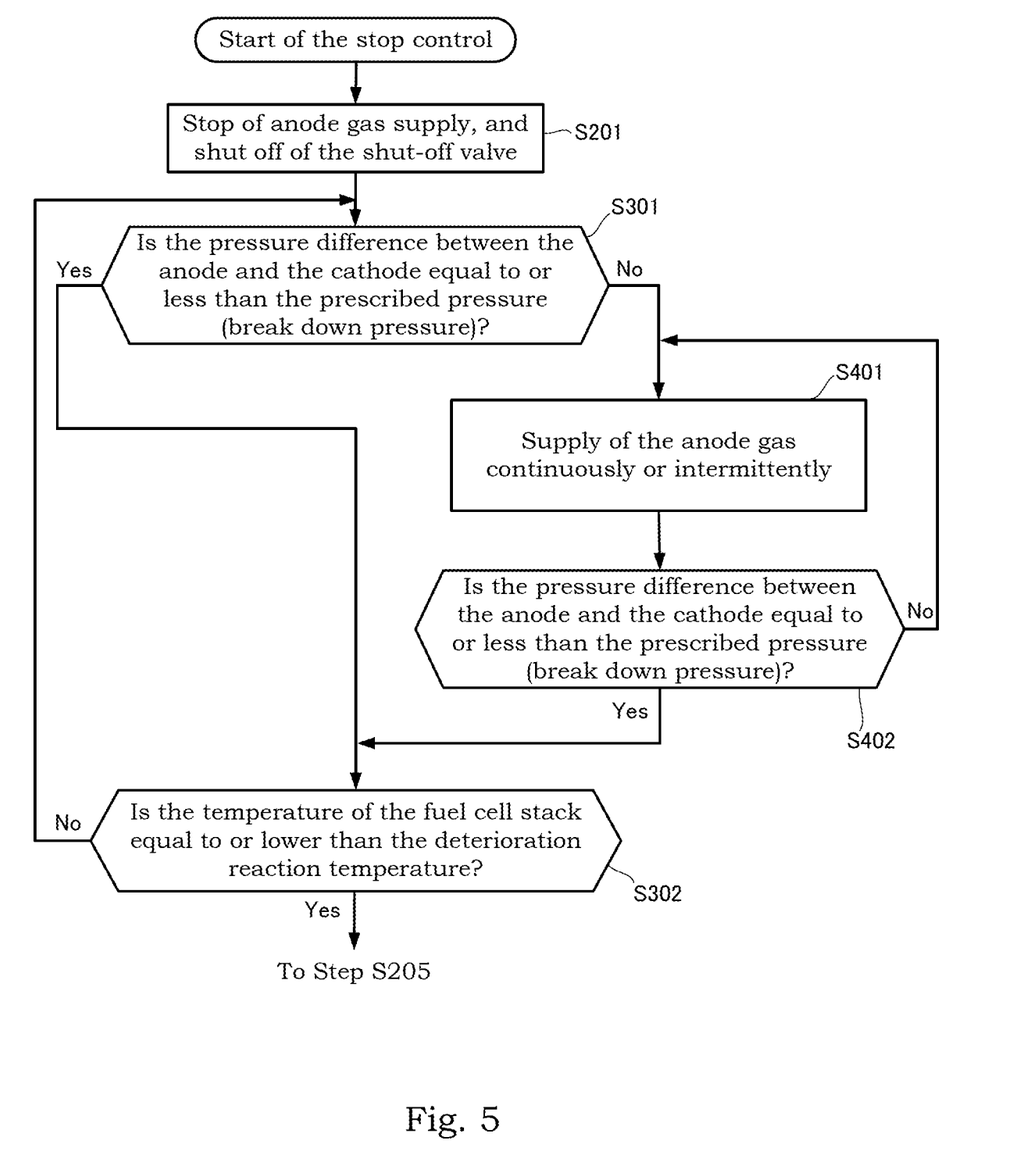
FIG. 5 is the second modified example of the flow chart shown in FIG. 3.

In FIG. 5, the second modified example of the stop control of the fuel cell system 10 is shown. In the second modified example, the additional control (A2) or (A3) mentioned before is carried out. In Step S301 mentioned before if the control unit 78 judges NO, in Step S401 the control unit 78 carries out the additional control (A2) or (A3). At this time, in Step S402 the control unit 78 continuously or intermittently judges whether or not the pressure difference becomes equal to or less than the prescribed pressure; and if the pressure difference does not become equal to or less than the prescribed pressure, the additional control of Step S401 is continued. Namely, by the control (A2), the control unit 78 continuously supplies the anode gas with measuring the pressure difference between the anode and the cathode in the fuel cell stack 12, and by the control (A3), intermittently supplies the anode gas with measuring the pressure difference between the anode and the cathode in the fuel cell stack 12; and these controls are continued until the pressure difference becomes equal to or less than the prescribed pressure. When the control unit 78 judges that the pressure difference becomes equal to or less than the prescribed pressure, the control moves to Step S302 mentioned before.

Figure 6:
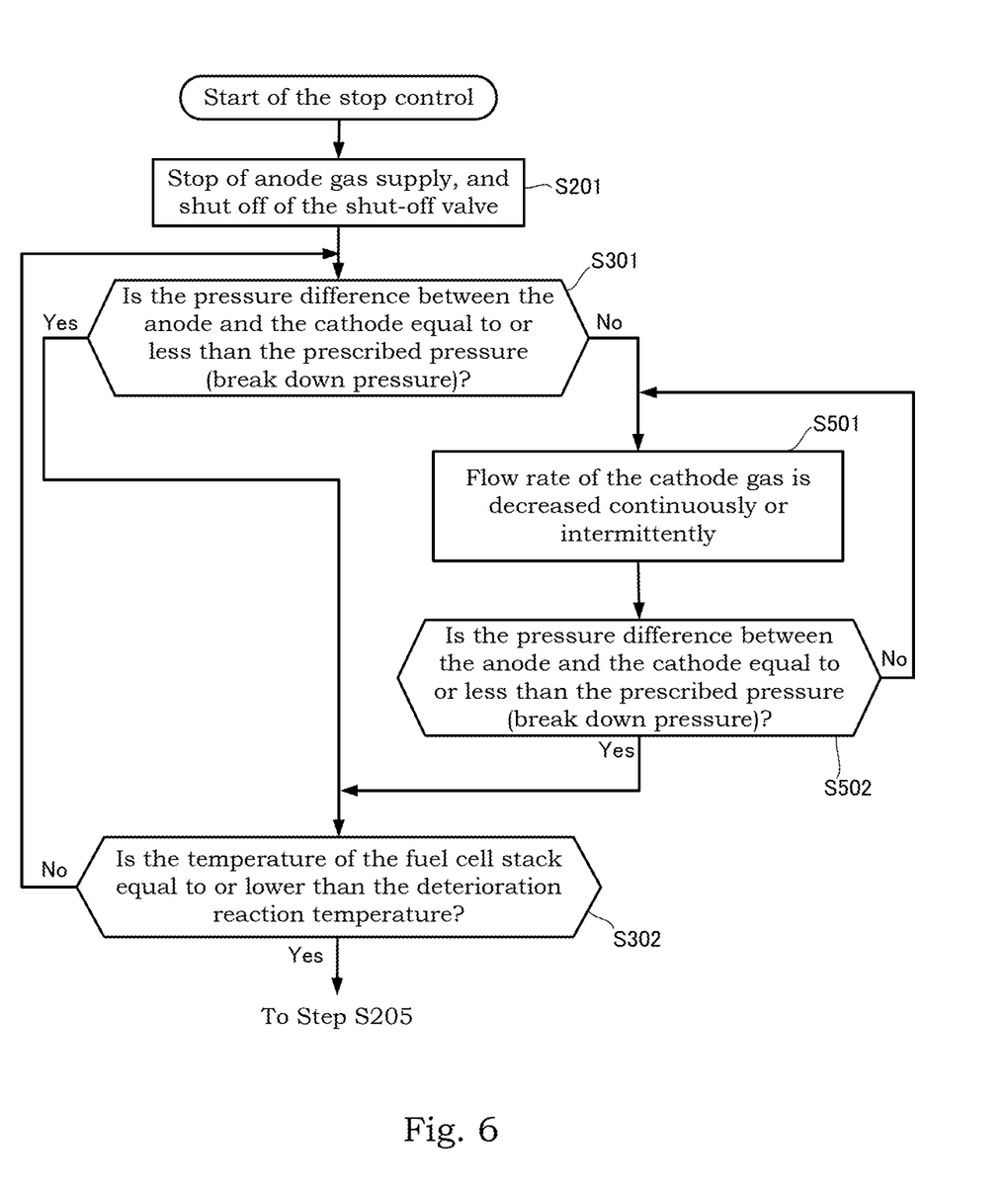
FIG. 6 is the third modified example of the flow chart shown in FIG. 3.

In FIG. 6, the third modified example of the stop control of the fuel cell system 10 is shown. In the third modified example, the additional control (B2) or (B3) mentioned before is carried out. In Step S301 mentioned before, if the control unit 78 judges NO, in Step S501 the control unit 78 carries out the additional control (B2) or (B3). At this time, in Step S502 the control unit 78 continuously or intermittently judges whether or not the pressure difference becomes equal to or less than the prescribed pressure; and if the pressure difference does not become equal to or less than the prescribed pressure, the additional control of Step S501 is continued. Namely, by the control (B2), the control unit 78 continuously decreases the flow rate of the cathode gas with measuring the pressure difference between the anode and the cathode in the fuel cell stack 12, and by the control (B3), intermittently decreases the flow rate of the cathode gas with measuring the pressure difference between the anode and the cathode in the fuel cell stack 12; and these controls are continued until the pressure difference becomes equal to or less than the prescribed pressure. When the control unit 78 judges that the pressure difference becomes equal to or less than the prescribed pressure, the control moves to Step S302 mentioned before.

Figure 7:
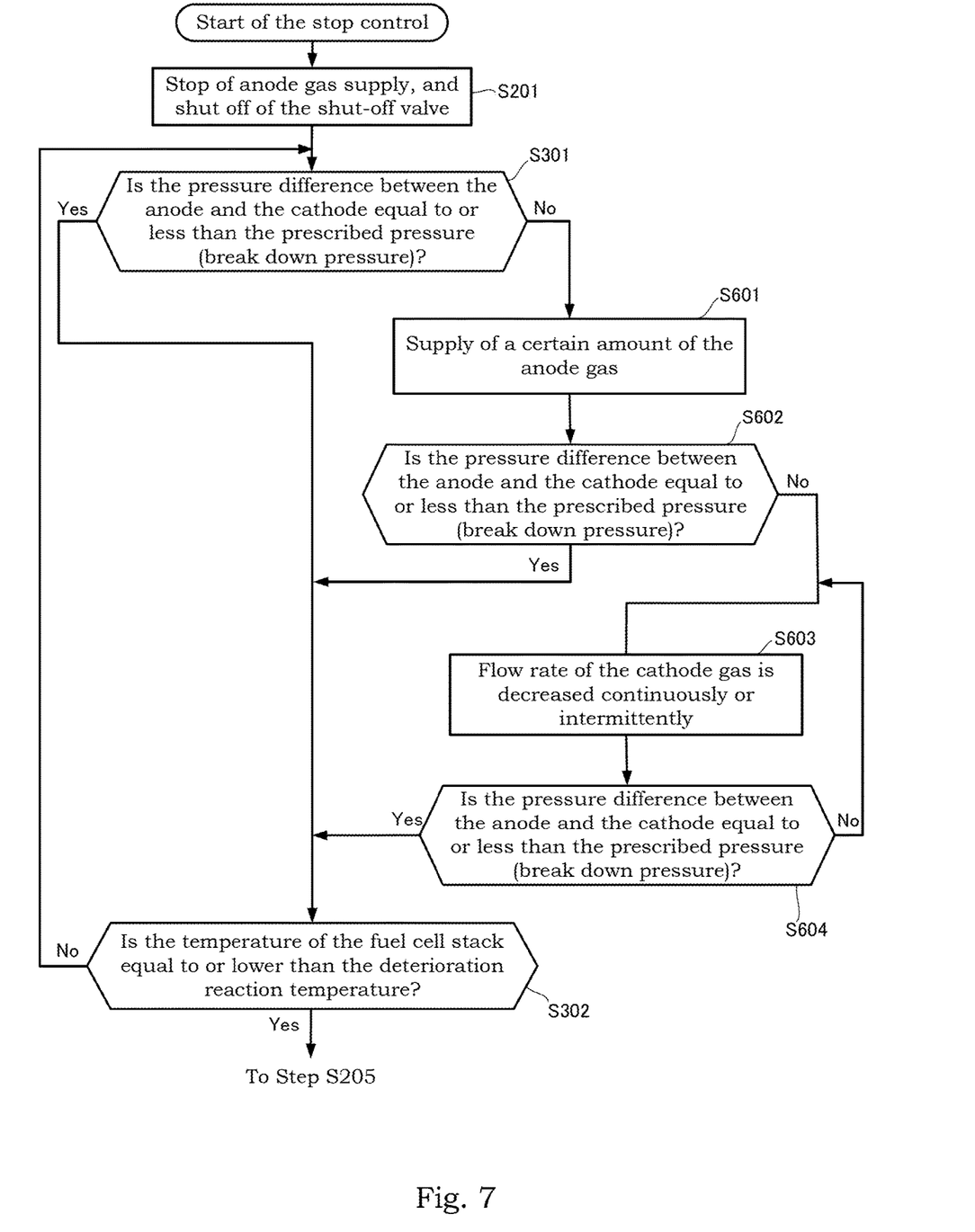
FIG. 7 is the fourth modified example of the flow chart shown in FIG. 3.

In FIG. 7, the fourth modified example of the stop control of the fuel cell system 10 is shown. In the fourth modified example, after the additional control (A1) is carried out, the additional control (B2) or (B3) is carried out, as needed. In the present embodiment, as mentioned before, in order to relax the pressure difference between the anode and the cathode in the stop control, there is a case that a prescribed amount of the anode gas is supplied to the anode. However, in spite that the prescribed amount thereof is supplied, there is a case that the pressure difference between the anode and the cathode becomes more than the prescribed pressure (break down pressure). Therefore, the fourth modified example is the effective stop control in the case that the pressure difference becomes more than the prescribed pressure (break down pressure) even with the supply of the anode gas.

In Step S301 mentioned before, if the control unit 78 judges NO, in Step S601 the control unit 78 carries out the control (A1). In Step S602 the control unit 78 judges whether or not the pressure difference is equal to or less than the prescribed pressure.

In Step S602, if the control unit 78 judges YES, the control moves to Step S302 mentioned before. On the other hand, in Step S602 if the control unit 78 judges NO, in Step S603 the control unit 78 carries out the same additional control as that of Step S501 mentioned before. At this time, in Step S604 the control unit 78 continuously or intermittently judges whether or not the pressure difference becomes equal to or less than the prescribed pressure; and if the control unit 78 judges NO, the additional control of Step S603 is continued. Namely, by the control (B2), the control unit 78 continuously decreases the flow rate of the cathode gas with measuring the pressure difference between the anode and the cathode in the fuel cell stack 12, and by the control (B3), intermittently decreases the flow rate of the cathode gas with measuring the pressure difference between the anode and the cathode in the fuel cell stack 12; and these controls are continued until the pressure difference between the anode and the cathode becomes equal to or less than the prescribed pressure. And in Step S604 if the control unit 78 judges YES, the control moves to Step S302 mentioned before. The second modified example to the fourth modified example result in the control in which the pressure difference between the anode and the cathode moves around the prescribed pressure (break down pressure), wherein the control is carried out until it moves to Step S302.

Meanwhile, in any of the stop controls mentioned above, while the shut-off valve 62 is shut off, if the pressure of the anode shown by the pressure sensor 74A becomes more than the pressure to almost cause breakage of the cell (break down pressure), regardless of the control stage, the control unit 78 opens the shut-off valve 62 so as to open the path 26C thereby avoiding the breakage of the fuel cell stack 12. On the other hand, in the stop control, if the pressure difference between the anode and the cathode in the fuel cell stack 12 does not go beyond the prescribed pressure (break down pressure), the shut-off valve 62 may be continued to be shut off even after termination of the stop control.

[Effects of the Method for Controlling the Fuel Cell System according to the Present Embodiment]

The fuel cell system 10 includes: the stop control unit (the control unit 78) in which while supply of the cathode gas is continued, supply of the anode gas is stopped and the shut-off valve 62 is shut off; and the additional control unit (the control unit 78) in which during control of the stop control unit, the additional control to control the anode gas, and/or the cathode gas is carried out, both gases being supplied to the fuel cell stack 12. Namely, as the stop control of the fuel cell stack 12, the control unit 78 stops supply of the anode gas while supply of the cathode gas (cooling gas) is continued, and shuts off the shut-off valve 62 so as to shut off the path 26C. And, during the stop control, the control unit 78 carries out at least one of the following additional controls, namely, the additional control in which the anode gas is supplied to the fuel cell stack 12 and the additional control in which the flow rate of the cathode gas (cooling gas) is decreased. With this, even if the pressure difference between the anode and the cathode emerges, this pressure difference is relaxed by the additional controls mentioned above, so that the breakage (deterioration) of the fuel cell stack 12 can be avoided. Meanwhile, the additional controls mentioned above are carried out after the control start time mentioned before has passed.

The control unit 78 carries out the additional controls on the basis of any of the pressure of the anode in the fuel cell stack 12 (control start pressure), the pressure difference between the anode and the cathode in the fuel cell stack 12, and the temperature of the fuel cell stack 12 (control start temperature). With this, the additional controls can be carried out without fail, with directly or indirectly measuring the pressure difference emerged in the fuel cell stack 12.

As in the first modified example, during the stop control, on the basis of the pressure difference between the anode and the cathode in the fuel cell stack 12, the control unit 78 carries out the additional control in which the anode gas is supplied to the fuel cell stack 12 and/or the additional control in which the flow rate of the cathode gas is decreased. With this, the additional controls can be carried out without fail, with directly measuring the pressure difference emerged in the fuel cell stack 12.

As in the second modified example, as the additional control, in the case that the anode gas is supplied to the fuel cell stack 12 while the flow rate of the cathode gas is made constant, the control unit 78 continuously or intermittently supplies the anode gas with measuring the pressure difference between the anode and the cathode in the fuel cell stack 12. With this, wasteful supply of the anode gas can be avoided.

As in the third modified example, as the additional control, in the case that the flow rate of the cathode gas is decreased without supplying the anode gas, the control unit 78 continuously or intermittently decreases the flow rate of the cathode gas with measuring the pressure difference between the anode and the cathode in the fuel cell stack 12. With this, a decrease in the flow rate of the cathode gas (cooling gas) more than necessary can be avoided, so that the decrease in the cooling efficiency of the fuel cell stack 12 can be suppressed.

As in the fourth modified example, as the additional control, in the case that the anode gas is supplied to the fuel cell stack 12 and the flow rate of the cathode gas is decreased, the control unit 78 supplies a prescribed amount of the anode gas to the fuel cell stack 12, and thereafter, continuously or intermittently decreases the flow rate of the cathode gas with measuring the pressure difference between the anode and the cathode in the fuel cell stack 12. With this, even if supply of the anode gas during the stop control is insufficient, by decreasing the flow rate of the cathode gas (cooling gas), not only the pressure difference can be made equal to or less than the prescribed pressure (break down pressure) without fail, but also a decrease in the flow rate of the cathode gas (cooling gas) more than necessary can be avoided; and thus, the decrease in the cooling efficiency of the fuel cell stack 12 can be suppressed. Meanwhile, the prescribed pressure may be set such that it is lower than the maximum pressure difference with which breakage of the fuel cell stack 12 can be avoided.

The control unit 78 carries out the control in which the shut-off valve 62 is opened when the temperature of the fuel cell stack 12 becomes equal to or lower than the deterioration reaction temperature (prescribed temperature). With this, deterioration of the anode during the stop control can be avoided. Meanwhile, this prescribed temperature may be set at a temperature lower than the deterioration reaction temperature.

The control unit 78 can carry out the control in which the state that the shut-off valve 62 is shut off is kept even after termination of the stop control. When the pressure difference between the anode and the cathode in the fuel cell stack 12 does not go beyond the prescribed pressure (break down pressure), it is preferable to keep the state that the shut-off valve 62 is shut off. With this, the discharge of the anode gas to outside can be prevented.

The discharged gas combustor 58 is attached in the downstream position of the shut-off valve 62 in the path 26C. With this, even if the anode gas flows into the discharged gas combustor 58 when the shut-off valve 62 is opened, it can be burnt in the discharged gas combustor 58.

The heater 66 is attached to the discharged gas combustor 58, so that the control unit 78 carries out the control in which the heater 66 is driven when the temperature of the discharged gas combustor 58 is lower than the combustion capable temperature (second prescribed temperature). With this, the anode gas can be burnt in the discharged gas combustor 58 without fail. Meanwhile, the second prescribed temperature may be set at a temperature higher than the combustion capable temperature.

The control unit 78 carries out the control in which the shut-off valve 62 is opened when the pressure of the anode in the fuel stack 12 goes beyond the prescribed pressure. With this, breakage of the fuel cell stack 12 during the stop control can be avoided. Meanwhile, this prescribed pressure may be set at a pressure lower than the maximum pressure (break down pressure) at which breakage of the fuel cell stack 12 can be avoided.

In the above description, embodiments of the present invention have been explained. However, the embodiments described above are mere partial examples of the application of the present invention; and thus, the description does not intend to limit the scope of the present invention within the specific composition of these embodiments.

This application is based on and claims priority to Japanese Patent Application No. 2015-243820, filed in Japan Patent Office on Dec. 15, 2015, the entire content of which is incorporated herein by reference.

The invention claimed is:

1. A method for controlling a fuel cell system including a solid oxide fuel cell which generates a power upon receiving supplies of an anode gas and a cathode gas, the method for controlling the fuel cell system comprising:
   as a stop control of the fuel cell, stopping a supply of the anode gas and power generation of the fuel cell while continuing a supply of the cathode gas to the fuel cell, and shutting off a discharge side of an anode of the fuel cell; and carrying out a first control to supply the anode gas to the fuel cell during the stop control and/or a second control to decrease the flow rate of the cathode gas during the stop control.

2. The method for controlling the fuel cell system according to claim 1, wherein
the first control and/or the second control is carried out on a basis of any one of a pressure of the anode in the fuel cell, a pressure difference between the anode and a cathode in the fuel cell, or a temperature of the fuel cell.

3. The method for controlling the fuel cell system according to claim 1, wherein
the first control is carried out so as to supply the anode gas to the fuel cell on a basis of a pressure difference between the anode and a cathode in the fuel cell during the stop control and/or the second control is carried out so as to decrease a flow rate of the cathode gas on a basis of a pressure difference between the anode and the cathode in the fuel cell during the stop control.

4. The method for controlling the fuel cell system according to claim 3, wherein
in a case that the first control is carried out to supply the anode gas to the fuel cell while the flow rate of the cathode gas is made constant,
with measuring the pressure difference between the anode and the cathode in the fuel cell, the anode gas is supplied.

5. The method for controlling the fuel cell system according to claim 3, wherein
in a case that the second control is carried out to decrease the flow rate of the cathode gas without supplying the anode gas,
with measuring the pressure difference between the anode and the cathode in the fuel cell, the flow rate of the cathode gas is decreased.

6. The method for controlling the fuel cell system according to claim 3, wherein
in a case that the first control and second control are carried out to supply the anode gas to the fuel cell and to decrease the flow rate of the cathode gas,
after a prescribed amount of the anode gas is supplied to the fuel cell, with measuring the pressure difference between the anode and the cathode in the fuel cell, the flow rate of the cathode gas is decreased.

7. The method for controlling the fuel cell system according to claim 1, wherein
the discharge side of the anode of the fuel cell is opened when a temperature of the fuel cell becomes lower than a prescribed temperature.

8. The method for controlling the fuel cell system according to claim 7, wherein
the prescribed temperature is set at a lower limit temperature at which deterioration of the anode of the fuel cell takes place.

9. The method for controlling the fuel cell system according to claim 1, wherein
a state that the discharge side of the anode of the fuel cell is shut off is kept even after termination of the stop control.

10. The method for controlling the fuel cell system according to claim 1, wherein
a discharged gas combustor is attached to the discharge side of the anode of the fuel cell.

11. The method for controlling the fuel cell system according to claim 10, wherein
a heater is attached to the discharged gas combustor, and
the heater is driven when a temperature of the discharged gas combustor is lower than a second prescribed temperature.

12. The method for controlling the fuel cell system according to claim 11, wherein
the second prescribed temperature is set at a lower limit temperature at which the discharged gas combustor can burn the anode gas.

13. The method for controlling the fuel cell system according to claim 1, wherein
the discharge side of the anode of the fuel cell is opened when a pressure of the anode of the fuel cell goes beyond a prescribed pressure.

14. A fuel cell system including a fuel cell which generates a power upon receiving supplies of an anode gas and a cathode gas; and the fuel cell system comprising:
a discharged gas path through which the anode gas discharged from the fuel cell flows,
a shut-off valve attached to the discharged gas path, and
a control unit configured to carry out a control of supplies of the anode gas and the cathode gas to the fuel cell, and a control of an open and shut-off of the shut-off valve; and
wherein
the control unit comprises:
a stop control unit configured to stop supply of the anode gas and power generation of the fuel cell, to continue supply of the cathode gas, and to shut off the shut-off valve,
a first control unit configured to supply the anode gas to the fuel cell during control of the stop control unit, and
a second control unit configured to decrease a flow rate of the cathode gas during control of the stop control unit.

15. The fuel cell system according to claim 14, wherein
the first control unit is configured to control the anode gas on a basis of a pressure difference between an anode and a cathode in the fuel cell during control of the stop control unit,
and the second control unit is configured to control the cathode gas supplied to the fuel cell on the basis of the pressure difference between the anode and the cathode in the fuel cell during control of the stop control unit.

* * * * *